United States Patent [19]

Jestice et al.

[11] Patent Number: 5,228,038

[45] Date of Patent: Jul. 13, 1993

[54] COMMUNICATION SYSTEM NETWORK THAT INCLUDES A BIM STATUS UPDATE METHOD

[75] Inventors: Calvin V. Jestice, Hoffman Estates; John W. Maher, Woodstock; Laura Christensen, Mt. Prospect, all of Ill.

[73] Assignee: Motorola Inc., Schaumburg, Ill.

[21] Appl. No.: 709,002

[22] Filed: Mar. 11, 1991

Related U.S. Application Data

[63] Continuation-in-part of Ser. No. 509,915, Apr. 16, 1990, Pat. No. 5,175,727.

[51] Int. Cl.⁵ .......................... H04J 3/12; H04L 12/52
[52] U.S. Cl. ................... 370/110.1; 370/58.2; 370/94.3; 455/53.1
[58] Field of Search .............. 370/13, 16, 17, 56, 370/58.1–58.3, 77, 79, 85.13–85.14, 94.3, 110.1, 94.1, 112; 455/9, 34.1, 54.1, 56.1, 53.1; 379/63, 58; 340/825.06

[56] References Cited

U.S. PATENT DOCUMENTS

| | | | |
|---|---|---|---|
| 4,532,625 | 7/1985 | Stover | 370/85.1 |
| 4,825,206 | 4/1989 | Brice, Jr. et al. | 370/16 |
| 4,974,224 | 11/1990 | Boone | 370/94.1 |

Primary Examiner—Douglas W. Olms
Assistant Examiner—H. Kizou
Attorney, Agent, or Firm—Timothy W. Markison; Steven G. Parmelee

[57] ABSTRACT

In a communication system network that includes a processing multiplexer, a plurality of communication units, and a plurality of communication systems, each of the plurality of communication systems includes a base interface modules for interfacing the communication system with a limited number of repeaters that transceive information amongst the plurality of communication units and a processing multiplexer interface module for interfacing the communication system with the processing multiplexer. Each processing multiplexer interface module includes a base interface database that stores base interface status information of the base interface module of each of the plurality of communication systems that is periodically updated. The base interface database is updated when a processing multiplexer interface module of one of the plurality of communication systems detects a change in the base interface status information of the one of the plurality of communication systems. Once a change is detected, the processing multiplexer interface module stores the change and transmits the change to the processing multiplexer interface module of the other communication systems. The processing multiplexer interface module also transmits unchanged base interface status information at varying time intervals to the processing multiplexer interface module of the other communication systems.

5 Claims, 11 Drawing Sheets

FIG. 10

| | ADDRESS | I/C | FC 1 | FC 2 | VOL. 2 | VOL. 1 | VOL. 0 | BUS No. | SLOT No. | |
|---|---|---|---|---|---|---|---|---|---|---|
| | | | | | | | | | | FRAME HEADER |
| | 000 000 000 000 | 0 | 0 | 0 | X | X | X | 00000 | 00111 | |
| | 000 000 000 001 | 0 | 0 | 0 | 1 | 1 | 0 | 00000 | 00111 | |
| 1011 | 000 000 000 010 | 0 | 0 | 0 | 1 | 0 | 1 | 00111 | 00010 | FIRST SECTION |
| | 000 000 000 011 | 0 | 0 | 0 | 1 | 0 | 0 | 11101 | 11111 | |
| | 000 000 000 100 | 1 | 0 | 0 | 0 | 0 | 0 | 00001 | 11011 | |
| 1012 | 000 000 000 101 | 0 | 0 | 0 | 1 | 1 | 1 | 11111 | 11111 | |
| | 000 000 000 110 | 1 | 0 | 0 | 1 | 1 | 1 | 11111 | 01111 | |
| 1013 | 000 000 000 111 | 1 | 1 | 1 | X | X | X | 00000 | 11111 | |
| 1014 | 000 000 001 000 | 1 | 1 | 0 | X | X | X | 00100 | 11111 | |
| | | | | | | | | | | FRAME HEADER |
| | 000 000 000 000 | 0 | 0 | 0 | X | X | X | 00000 | 00111 | |
| | 000 000 000 001 | 0 | 0 | 0 | 1 | 1 | 0 | 00000 | 00111 | |
| 1011 | 000 000 000 010 | 0 | 0 | 0 | 1 | 0 | 1 | 00111 | 00010 | SECOND SECTION |
| | 000 000 000 011 | 0 | 0 | 0 | 1 | 0 | 0 | 11101 | 11111 | |
| | 000 000 000 100 | 1 | 0 | 0 | 0 | 0 | 0 | 00001 | 11011 | |

DESTINATION DATABASE

FIG. 11

| | BUS No. | SLOT No. | |
|---|---|---|---|
| 1100 | ADDRESS | | PCM CODE |
| 1103 | 00000 | 00000 | PCM CODE FOR SLOT 0 OF AEB BUS 0 |
| 1104 | 00000 | 00001 | PCM CODE FOR SLOT 1 OF AEB BUS 0 |
| 1105 | 00000 | 00010 | PCM CODE FOR SLOT 2 OF AEB BUS 0 |
| 1106 | 10111 | 00000 | PCM CODE FOR SLOT 0 OF AEB BUS 23 |
| 1107 | 10111 | 00001 | PCM CODE FOR SLOT 1 OF AEB BUS 23 |

SIGNAL DATABASE

COMMUNICATION SYSTEM NETWORK THAT INCLUDES A BIM STATUS UPDATE METHOD

This patent application is a continuation-in-part of co-pending patent application filed on Apr. 16, 1990, Ser. No. 07/509,915, entitled A COMMUNICATION SYSTEM NETWORK, now U.S. Pat. No. 5,175,727.

TECHNICAL FIELD

This invention relates generally to communication systems and in particular to a method and apparatus that allow such communication systems to be linked together to create a communication system network.

BACKGROUND OF THE INVENTION

Presently, there are two basic types of land-mobile communication systems: conventional communication systems (FIG. 1) and trunked communication systems (FIG. 2). Each type of communication system comprises a plurality of communication units, a limited number of communication resources, a communication resource allocator, and a plurality of operator stations (consoles). The communication resource allocator comprises a plurality of base interface modules (BIMs), a plurality of operator mux interface modules (OMIs), a plurality of audio expansion interface modules (AEIs), and at least one TDM bus. Each BIM acts as both a signal source and a signal destination. As a signal source, the BIM receives audio signals from at least some of the plurality of communication units, via a repeater or base station, converts the signals into digitized signals, and sources them to a slot in the TDM bus. See FIG. 3 for a typical TDM slot assignment pattern. (For an operational description of the TDM bus and slot location, refer to Motorola, Inc., Pub. No. R4-2-37C, CENTRACOM Series II Control Centers (March, 1988).) The BIM also acts as a designated signal source by conveying communication system data produced by a communication unit, or units, to the rest of the communication system. As a signal destination, the BIM receives digitized signals from the TDM bus, converts them to audio signals, and sends the audio signals to the repeater or base station such that the audio signals may be transmitted, via a communication resource, to at least some of the plurality of communication units.

Within either type of communication system, an OMI and an AEI are used to interface a console to the rest of the system. Generally, the OMI contains, in firmware, information that allows its respective console to perform supervisory functions and information regarding the typical communication system configuration. The typical communication system configuration includes, but is not limited to, the number of repeaters, number of signal sources, the number of signal destinations, the TDM slot assignments for each signal source and signal destination, the type of each BIM, and number and codes of communication groups. (For a detailed description of supervisory functions and CCMs, refer to Motorola, Inc. Pub. No. R4-2-73, CENTRACOM Series II Plus Control Centers (April, 1988). However, for use herein, consoles need not incorporate all of the described features as listed in the CENTRACOM Series II Plus Control Centers publication.) The OMI, as a designated signal source, sources communication system data to the TDM bus, wherein the communication system data comprises information about the typical communication system configuration, information about selected supervisory functions, and/or information about selected signal destinations. The OMI further acts as a signal source by receiving audio signals from its respective console, converting the signals into digitized signals, and sourcing the digitized signals, in the appropriate slot, to the TDM bus.

The OMI, however, does not act as a signal destination for its respective console, the AEI performs this function. The AEI, as a signal destination, receives digitized signals from the TDM bus, converts the signals into audio signals, and sends the audio signals to a speaker that is controlled by an assigned CCM of the console. The audio signals sent to the speaker may comprise a plurality of audio signals that were generated by several signal sources, such that the operator of the console may monitor and supervise several signal source via one speaker and one CCM per signal source. The AEI acts as a signal destination for each CCM on a console, thus if a console has ten CCMs, the AEI acts as ten signal destinations. It should be noted that the actual signal sources and signal destinations are the communication units and console, however, they are addressed by their respective communication system interfacing modules (BIMs, OMIs, and AEIs). Thus, for the purposes this discussion, the OMIs and BIMs will be referenced as signals sources, while the AEIs and BIMs will be referenced as signal destinations.

As described above, conventional communication systems and trunked communication systems have several characteristics alike, however, each communication system operates in a distinct mode. The typical conventional system of FIG. 1 comprises a plurality of communication units, a plurality of repeaters that transceive information via communication resources, a communication resource allocator (central electronics bank (CEB)), and a plurality of consoles. Also shown is a computer aided dispatcher (CAD) which may also be incorporated into trunked communication system. (For a description of the CAD, refer to Motorola, Inc. Pub. No. R4-2-73, CENTRACOM Series II Plus Control Centers (April, 1988).) The typical communication system configuration of a conventional communication system has communication groups assigned to specific repeaters, wherein specific consoles are assigned to monitor some of the communication groups. (A communication group comprises at least some of the plurality of communication units that are typically used for like purposes, e.g. police department, fire department, etc.) The repeater and communication group assignments may be changed by a CAD, but regardless of the assignments, a console monitors only the repeaters having at least one of its communication group assigned to it. For a further discussion of the convention system refer to U S. Pat. No. 4,630,263, entitled TIME DIVISION MULTIPLEX COMMUNICATION CONTROL SYSTEM, assigned to Motorola, Inc.

The typical trunked communication system of FIG. 2 comprises a plurality of communication units, a plurality of repeaters that transceive signals via communication resources, a communication resource allocator, and a plurality of consoles. (As with a conventional communication system, the communication resources may be telephone lines, frequency pairs, carrier frequency, or TDM slots.) The typical communication system configuration of the trunked communication system comprises the communication units arranged into a plurality of communication groups, where the repeaters are allocated to a communication group upon request. The consoles are assigned to monitor specific communication groups, however, the console cannot monitor a specific repeater as in a conventional communication system. The console must receive information from the communication resource allocator about the repeater that has been allocated to one of its communication groups. For a further description of the trunked communication system refer to U. S. Pat. No. 4,698,805 entitled CONSOLE INTERFACE FOR A TRUNKED RADIO SYSTEM, assigned to Motorola, Inc.

Despite all the features that each communication system offers to subscribers (user of a communication unit) and console operators, their use is limited to the communication system that the subscribers and console operators are affiliated with. This may be a substantial limiting factor in large metropolitan areas having a large number of subscribers and console operators. For example, if a city has a large police force, fire department, and other civil service departments, several communication systems may be needed to adequately service them. Because communication systems may not actively communicate with other communication units, the city must have several central control stations instead of one. For example, if the city has thirty communication systems with the police force subscribing to several of the systems, the city's police force may not all communicate together, nor can one console operator send a supervisory message to the entire police force. Therefore, a need exists for a communication system network that allows communication units in either type of communication system to communicate with other communication units in the same or different communication systems and that allows console operators to monitor and supervise communication groups in its communication system as well as communication groups in other communication systems.

SUMMARY OF THE INVENTION

These needs and others are substantially met by the communication system network that includes a BIM status update method disclosed herein. In a communication system network that includes a processing multiplexer, a plurality of communication units, and a plurality of communication systems, each of the plurality of communication systems includes base interface means for interfacing with a limited number of repeaters that transceive information amongst the plurality of communication units and processing multiplexer interface means for interfacing the communication system with the processing multiplexer. Each processing multiplexer interface means includes a base interface database that stores base interface status information of the base interface means of each of the plurality of communication systems that is periodically updated. The base interface database is updated when a processing multiplexer interface means of one of the plurality of communication systems detects a change in the base interface status information of the one of the plurality of communication systems. Once a change is detected, the processing multiplexer interface means stores the change and transmits the change to the processing multiplexer interface means of the other communication systems. The processing multiplexer interface means also transmits unchanged base interface status information at varying time intervals to the processing multiplexer interface means of the other communication systems.

BRIEF DESCRIPTION OF THE DRAWINGS

FIG. 10 illustrates a portion of the destination database having example data stored therein.

FIG. 11 illustrates a portion of the signal database having example data stored therein.

BEST MODE FOR CARRYING OUT THE INVENTION

Figure 4:
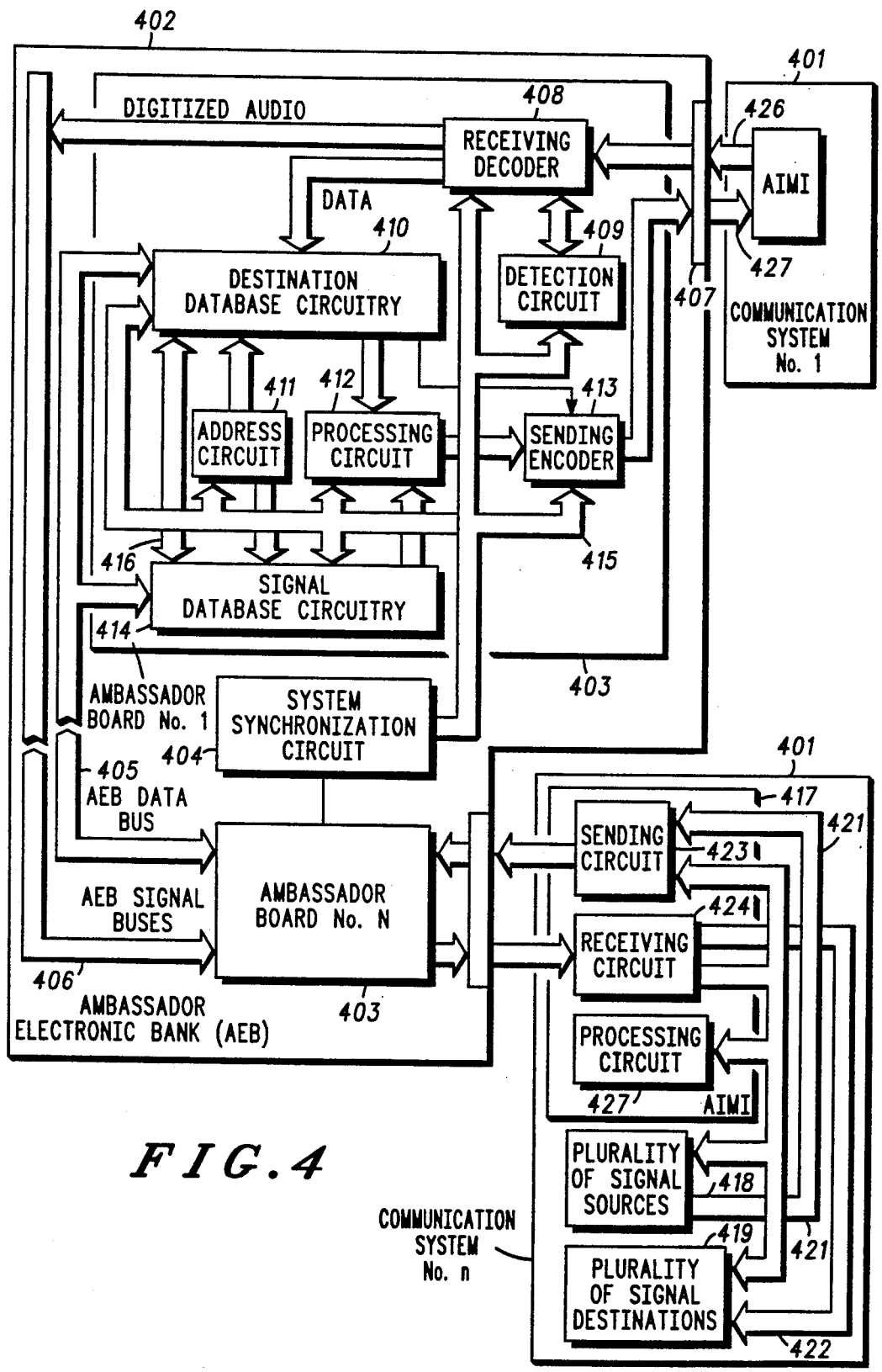
FIG. 4 illustrates a communication system network in accordance with the present invention.

FIG. 4 illustrates a communication system network that comprises a plurality of communication systems (401) and a processing multiplexer or ambassador electronics bank (AEB) (402). The plurality of communication systems (401) may comprise conventional communication systems (100) and/or trunked communication systems. The AEB (402) comprises a plurality of ambassador boards (403), a system synchronization circuit (404), an AEB data bus (405), an AEB signal buses (406), and a plurality of communication ports (407). Each of the ambassador boards (403) comprises a receiving decoder (408), a detection circuit (409), communication system database circuitry (410), an address circuit (411), a processing circuit (412), a sending circuit (413), signal database circuitry (414), an address bus (415), and a plurality of interconnection buses (416). Each of the plurality of communication systems (401) is coupled to a communication port by at least one source interface bus (426) and at least one destination interface bus (427). Each communication system (401) comprises an ambassador interface mux interface module (AIMI) (417), a plurality of signal sources (418), a plurality of signal destinations (419), a data bus (420) a source bus (421), and a destination bus (422). The AIMI (417) comprises a sending circuit (423), a receiving circuit (424), and a processing circuit (425).

Generally, within the AEB (402), each ambassador board (403) is operably coupled to at least one communication port (407), to the AEB data bus (405), and to the AEB signal buses (406). The best mode contemplated has each ambassador board (403) coupled to two communication ports (407), such that each ambassador board may service two communication systems (401). To achieve this, the ambassador board (403) would include a second receiving decoder (not shown) and a second sending encoder (not shown) connected to another communication port (407). Internally, the second receiving decoder and the second sending encoder are connected to the signal database circuitry (414), the detection circuit (409), the system data database circuitry (410), and the addressing circuit (411) in a similar fashion as the first sending encoder (413) and first receiving decoder (408). Because the second receiving decoder and the second sending encoder operate in a similar fashion as the first receiving decoder (408) and the first sending encoder (413), respectively, only the operation of the first receiving decoder (408) and the first sending encoder (413) will be discussed.

Upon receiving signals and communication system data from a communication system, via a source interface bus (426), the receiving decoder decodes the signals and communication system data and separates them. (A more detailed description of the receiving decoder's operation and the format of the source interface bus will be discussed below.) The separated signals are placed on one of the AEB signal buses (406) and the separated communication system data is routed to the system data database circuitry (410). The AEB signal buses (406) comprises thirty-two individual buses, each bus being dedicated to a communication system, such that the separated signals are placed on the bus dedicated to the communication system that produced the signals. The dedication of AEB buses (406) to communication systems (401) is determined by which communication port the communication system is operably coupled to. Thus, the communication system (401) that is coupled to the first communication port (407) has the first AEB bus dedicated to it.

The separated signals produced by each of the communication systems (401), are synchronously placed on their respective AEB signal bus (406). (A detailed description of the communication system network synchronization process will be discussed below.) Each signal database circuitry (414) is coupled to all the AEB signal buses (406) and, for this portion of the synchronization period or predetermined time frame, stores each of the separated signals in a signal database as an eight bit PCM code. The best mode contemplates that each signal database will be a dual port random access memory device (DPRAM), nevertheless, any reprogrammable memory device will suffice. The signal database may store each of the signals as information pertaining to them, if a different coding scheme of the signals is employed, such as a linear representation or other digital representation. (A detailed description of the signal database circuitry (414) will be discussed below.)

The separated communication system data is routed to the system data database circuitry (410). The separated communication data generally comprises information about the typical communication system configuration (i.e. communication group-console assignments, number of repeaters, number of consoles, composition of communication groups in the communication system), information about requested, or selected, supervisory functions, and information about signal destinations. The information about signal destination is stored, during a portion of the synchronization period or predetermined time frame, as an eight bit PCM code in a destination database. The best mode contemplates that each destination database will be DPRAM, nevertheless, any reprogrammable memory device will suffice. The remaining separated communication system data is stored in random access memory devices (RAM), or reprogrammable memory device. The communication system data that is stored in RAM is subsequently placed on the AEB data bus (405). (A detailed description of the system data database circuitry (410) will be discussed below.)

The addressing circuit (411) produces addresses for the separated signals and for the separated communication system data. The addresses are used by the signal database circuitry (414) and the system data database circuitry (410) to store the respective information in identifiable locations. The address for each signal is determined by the communication system that is from and the signal source that generated it. For example, if the signal was generated by the third signal source of the fifteenth communication system its address may be 01111 00011. Similarly, the address for the communication system data is determined by the communication system it is from and the designated signal source that produced it.

Once the signals or information pertaining to the signals are stored in each of the signal databases and the communication system data or the information pertaining to the communication system data is stored in the respective system data database circuit within a portion of the predetermined time frame, in the next portion of the predetermined time frame, the processing circuit (412) in each ambassador board (403) processes the stored signals based on, at least in part, on the stored communication system data. The processing of the stored signals typically involves producing processed signals for each of the signal destinations of the communication system coupled to the ambassador board (403). The processed signals typically comprise a summation of signals that the signal destination is to receive, wherein the volume levels of each of the summed signals may be varied. (A detailed description of the processing circuit will be discussed below.)

In a subsequent portion of the predetermined time frame or synchronization period, the processed signals are routed to the sending encoder (413) of the ambassador board (403). The sending encoder (413) encodes the processed signals and data produced by the system data database circuitry (410). Once the information is encoded, it is placed onto the destination interface bus (427). The best mode contemplates that the destination interface bus (427) will comprise two buses, such that each communication system may have twice as many signal destinations as signal sources.

The master synchronization circuit (404) of the AEB (402) generates, at least, a master clock signal and a frame sync signal. The best mode contemplates that the master clock signal will have a frequency of about 2.048 MHz and the frame sync signal will have a frequency of about 8 KHz. Each communication system receives the master clock signal and the frame sync signal from the master synchronization circuit (404) and reconstructs it to produce its own clock signal of about 2.048 MHz and own frame sync signal of about 8 KHz. Synchronization buffers are used to compensate for propagation delays between the communication systems and the AEB, operation of the synchronization buffers will be discussed below. Due to the propagation delays between the communication systems and the AEB, it several frame sync signals (predetermined time frame) to transmit a signal from a signal source to a signal destination. The best mode contemplates that the predetermined time frame will comprises about eleven frame sync signals, two for producing and placing signals on the source interface bus, two for receiving and placing the signals on the AEB signal buses (406), two for storing the signals in the signal database, one for processing the signals, two for placing the processed signals on the destination interface buses (427), and two for routing the processed signals to the respective signal destinations.

Figure 1:
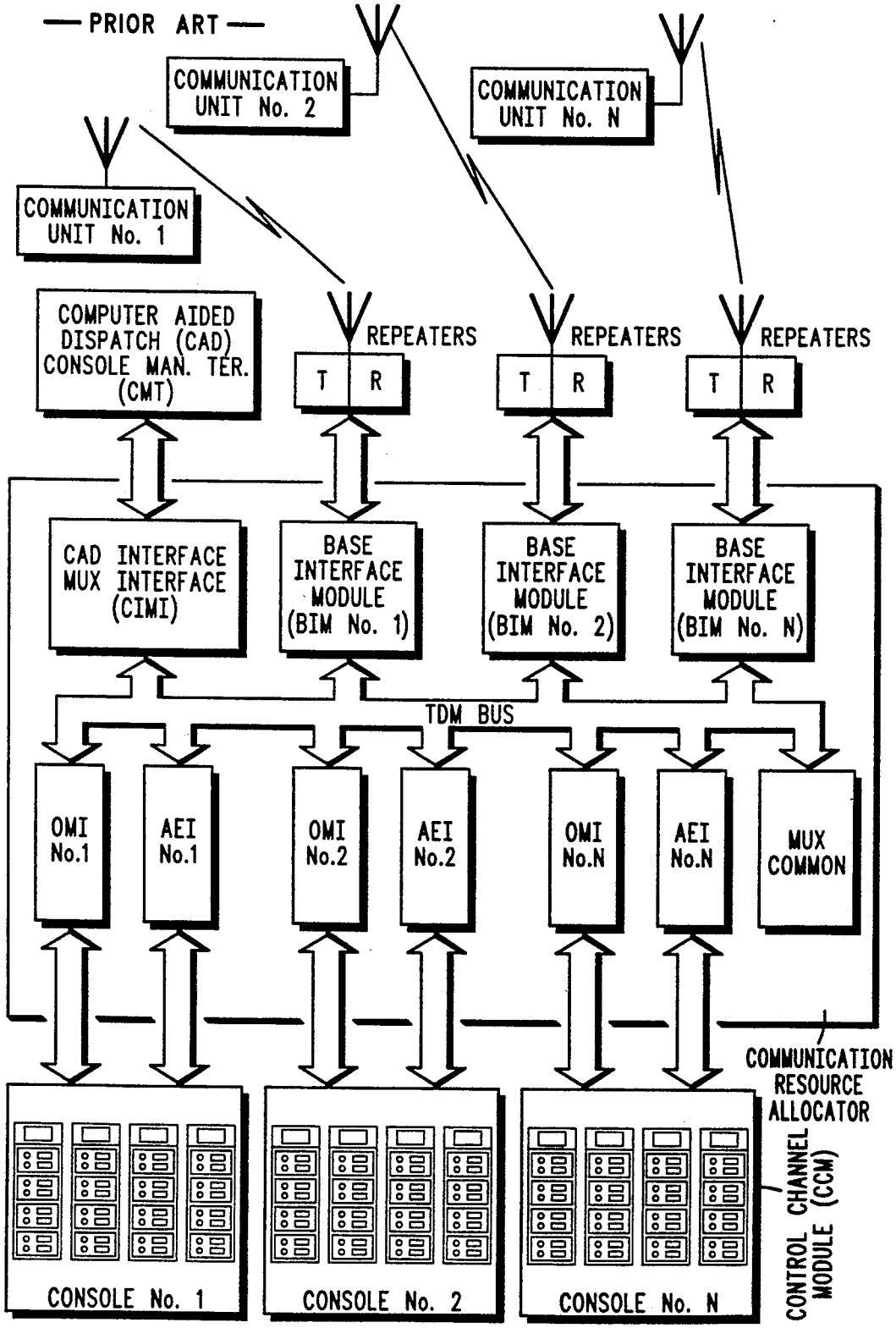
FIG. 1 illustrates a typical conventional communication system of the prior art.
Figure 2:
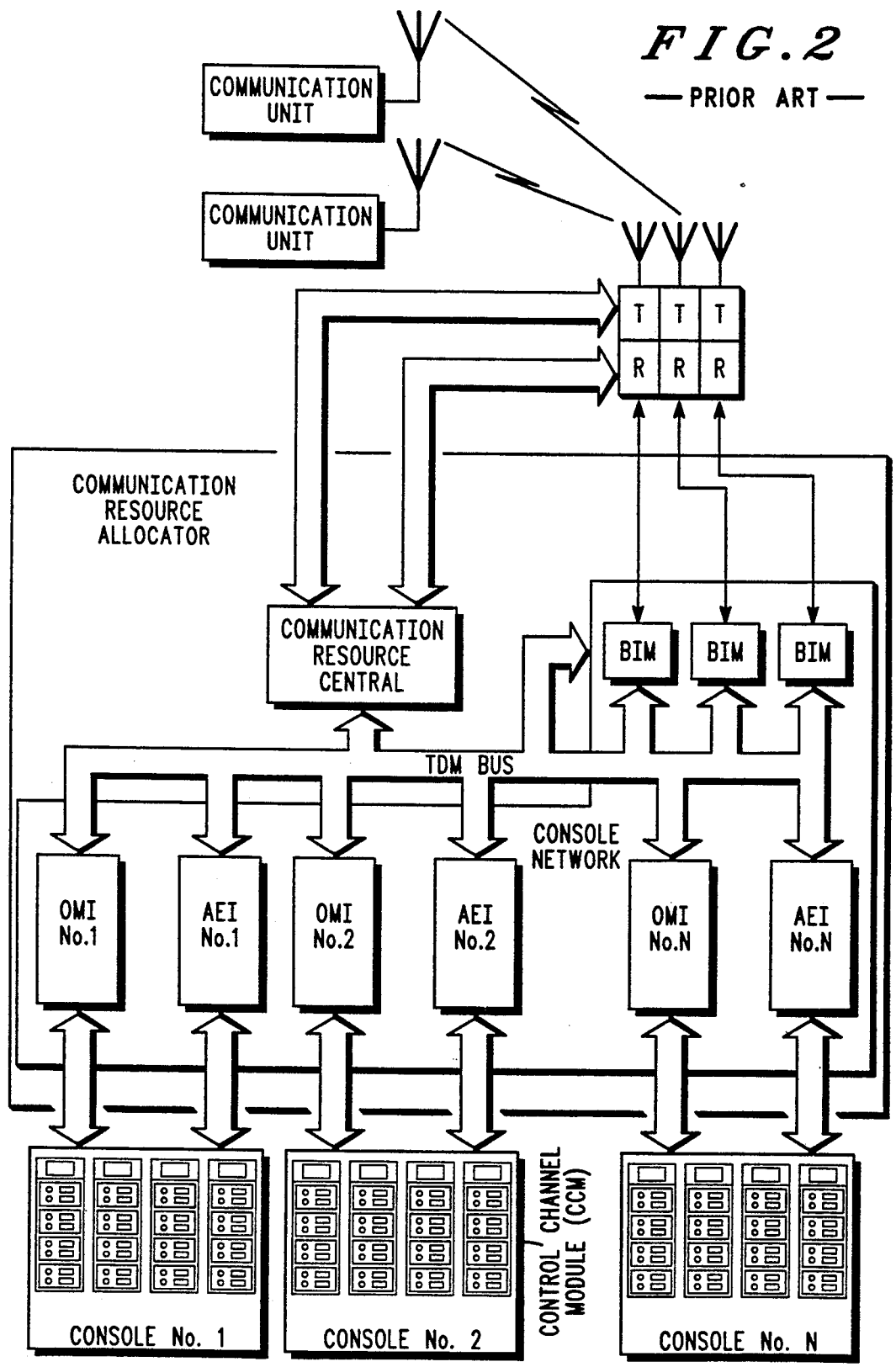
FIG. 2 illustrates a typical trunked communication system of the prior art.
Figure 3:
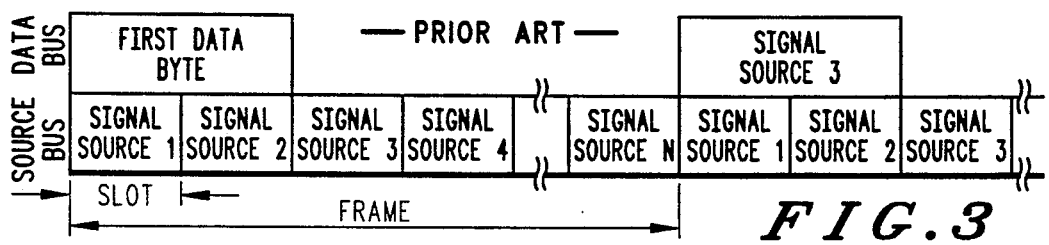
FIG. 3 illustrates a diagram of a TDM bus of the prior art.

Generally, within each communication system (401), the AIMI (417) is operably coupled to the plurality of signal sources (418) and the plurality of signal destinations (419) via a CEB TDM data bus (420), a CEB TDM source bus (421) and two CEB TDM destination buses (422) (only one shown). As mentioned, the plurality of signal sources (OMIs and/or BIMs) receive audio signals generated by either a communication unit or a console and convert the signals into digitized audio. The digitized audio is placed on the CEB TDM source bus (421) in the slot assigned to the particular OMI or BIM. (See FIG. 3 for a graphic representation of slot assignments.) At least some of the OMIs and or BIMs, as designated signal sources, generate communication system data and place it on the CEB TDM data bus (421). (Access to the CEB TDM data bus is generally based on a round robin polling process, such that only one BIM or one OMI is designated to transmit data on the CEB TDM data bus at any given time.)

The sending circuit (423) of the AIMI (417) receives the digitized audio from the CEB TDM source bus (421) and the communication system data from the CEB TDM data bus (420) per frame. The sending circuit (423) places the digitized audio and the communication system data on the source interface bus (426). After the AEB processes the digitized audio and the communication system data, the processed signals are received by the receiving circuit (425). The receiving circuit (425), via the CEB TDM destination bus (422), routes the processed signals to the plurality of signal destinations (419).

Figure 5A:
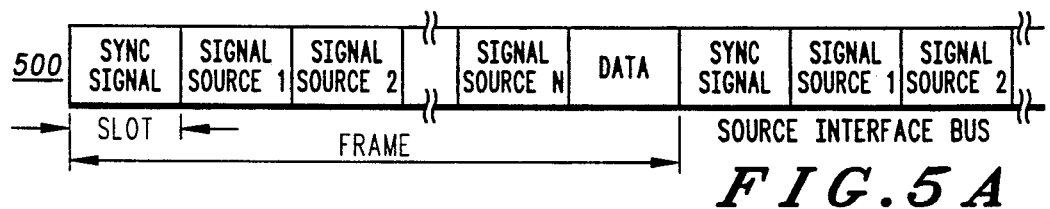
FIG. 5 illustrates a TDM slot arrangement of the source interface bus and the destination interface buses.
Figure 5B:
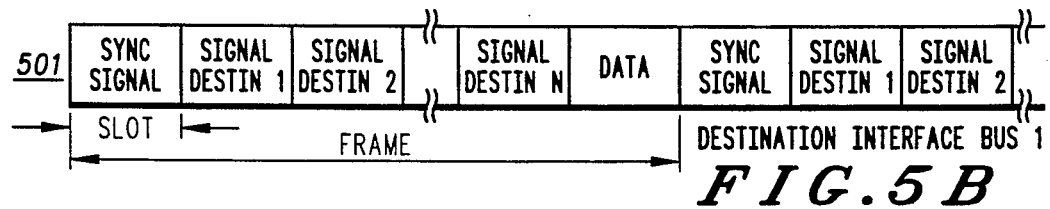
Figure 5C:
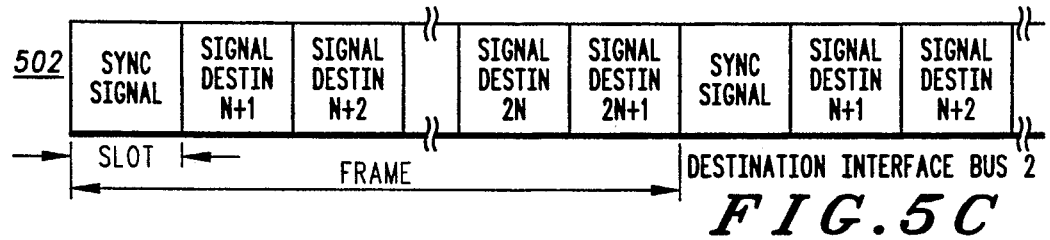

FIG. 5 illustrates a TDM format of the source interface bus (500) and the destination interface buses (501 and 502). The TDM format of the source interface bus (500) comprises a train of frames, each frame consisting of thirty-two slots. The first slot contains sync signal information that comprises a frame header code to indicate the beginning of a frame. The next thirty slots comprise an eight bit PCM code representing signals produced by the signal sources of the communication system. The last slot of the frame comprises an eight bit PCM code representing communication system data. The TDM format of the first destination interface bus (501) comprises a train of frames, wherein each frame consists of thirty-two slots. The first slot contains a frame header code, the next thirty slots contain an eight bit PCM code representing processed signals for some of the signal destinations, and the last slot contains network data that may be for any of the signal sources and/or signal destinations. The TDM format of the second destination interface bus (502) comprises a train of frames, wherein each frame comprises thirty-two slots. The first slot comprises a frame header code, while the remaining slots contain eight bit PCM codes representing the processed signals for the remaining signal destinations. The frame header code is an eight bit signal that is used to synchronize the communication system to the AEB (402). The best mode contemplates that the frame header code will be the binary representation of the number eight. It should be apparent to a practitioner skilled in the art that the assignment of slot locations within a frame may be varied from the above description without substantially altering the spirit of the present invention.

Figure 6:
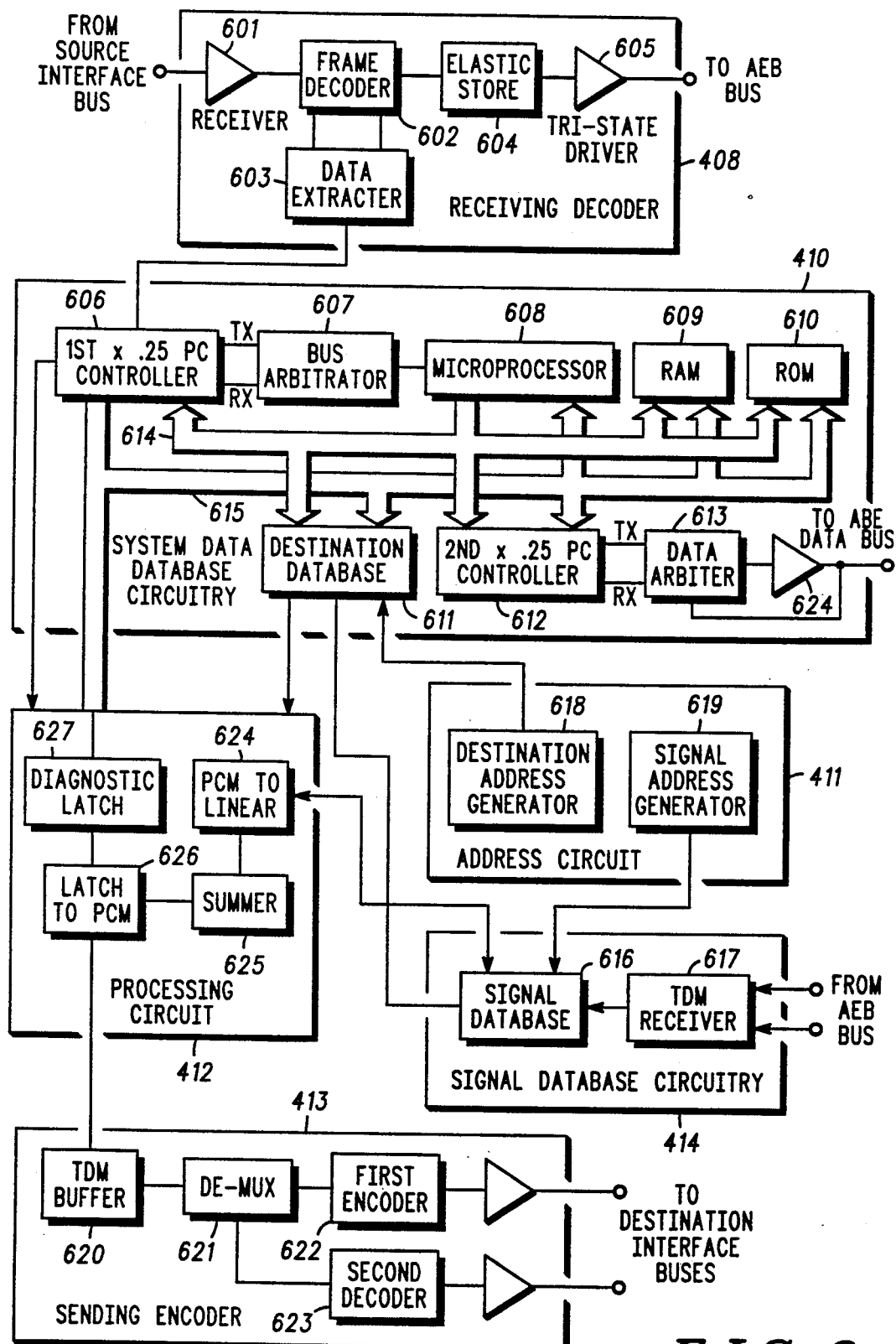
FIG. 6 illustrates a circuit diagram of an ambassador board.

FIG. 6 illustrates a block diagram of an ambassador board (403) that, as previously mentioned, comprises a receiving decoder (408), a detection circuit (409), communication system database circuitry (410), an address circuit (411), a processing circuit (412), a sending encoder (413), and signal database circuitry (413). The receiving decoder (408) receives and decodes signals and communication system data received on the source interface bus (426). The signals, the sync signals, and the communication system data are received through the receiver, or buffer, (601) and sent to a frame decoder (602). The best mode contemplates that the frame decoder (602) will be a Manchester decoder such that the sync signals, the signals, and the communication system data may be decoded, or separated. The separated communication system data is routed to a data extractor (603), while the separated signals are routed to an elastic store device (604). Both the data extractor (603) and the elastic store device (604) utilize the separated sync signal.

The data extractor (603) which may be a field programmable gate array, extracts the communication system data contained in the last slot of the frame as stores it. (Recall from FIG. 3 that only portions of data are transmitted in any one frame.) The data extractor (603) continually extracts the communication system data from the last slot and stores it until a complete communication system data message has been stored. Once a complete data message is contained with the data extractor (603), the data extractor (603) routes the complete message to the system data database circuitry (410). A detailed description of the system data database circuitry (410) will be discussed below.

The elastic store device (604), which may be a DPRAM, is used as a synchronization buffer and comprises two identical sections. The sections are used in an alternative manner, such that when one section is storing signals, the other section is sourcing signals to one of the AEB signal buses (406). When a frame cycle ends, the sections reverse roles, such that the section that was storing signals in the previous frame cycle is now sourcing the signals to one of the AEB signal buses (406), while the other section is storing signals from the frame decoder (602). Thus, it takes two frame cycles, or signals, to receive and place signals on the AEB signal buses (406). If the sync signal in a communication system is slightly different than the sync signal produced by the AEB, the elastic store device (604) will separate the sourcing and storing of signals by one frame cycle when the source pointer and store pointer are at the same location in a section.

Figure 8:
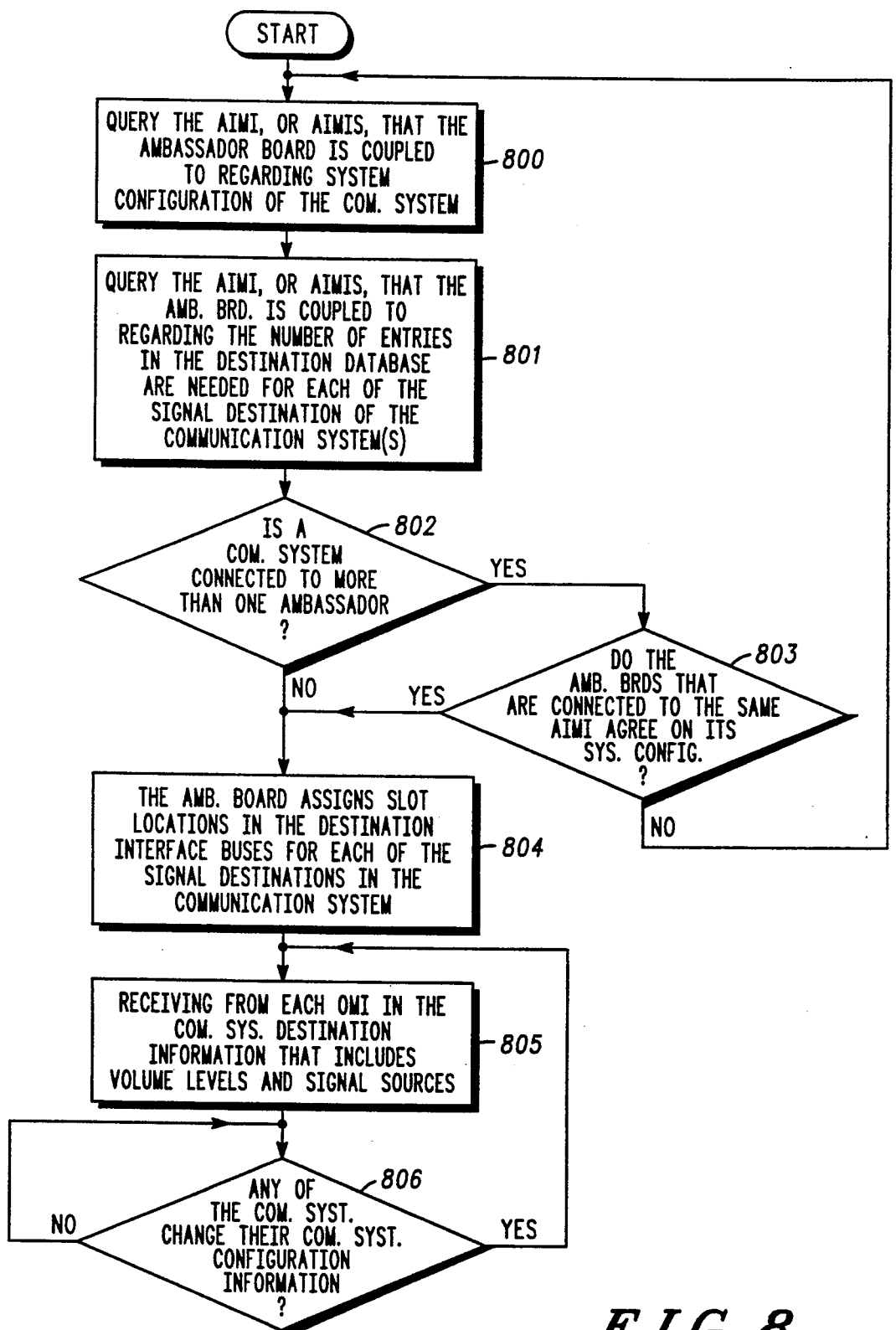
FIG. 8 illustrates a logic diagram of a process for producing addresses for the destination database.

The addressing circuit (414) of the ambassador board (403) comprises a destination address generator (618) and a signal address generator (619). The destination address generator (618) typically comprises a microprocessor, or other digital process, that performs the logic functions as shown in FIG. 8. To establish addresses for each of the signal destinations of the respective communication system, the ambassador board (403) queries the AIMI (417) of the respective communication system regarding the communication system configuration (800). As previously mentioned, the communication system configuration comprises information about the number of signal sources and signal destinations that are contained in the communication system. After receiving the communication system configuration (800), the ambassador board (403) queries the AIMI (417) regarding the number of entries, or addresses, the communication system is going to need in the destination database (801). The number of entries is based on the number of signals that each signal destination is to receive. For example, if the communication system has fifty signal destinations and each signal destination is to receive four signals, the number of entries needed would be two hundred. Also the some entries would be needed for active data transmissions.

If a communication system (401) is connected to more than one ambassador board (403) (802), each of the ambassador boards that the AIMI (417) is connected to verifies that they each have received the same information in steps 800 and 801 (803). The best mode contemplates that each communication system will be redundantly connected to the AEB via two ambassador boards. One ambassador board will be designated as an active board, while the other will be designated as a backup board. If the ambassador boards do not agree on the information received from the AIMI (803), they query the AIMI again. This process will repeat until the ambassador boards agree on the information, or until one ambassador board assumes priority. An ambassador board may assume priority either by designation or by a quality test. For designated priority, the information acquired by the active board is given priority after several unsuccessful attempts to match the information. For priority based on a quality test, the ambassador board having a higher quality connection to the AIMI will be given priority, where a higher quality connection may, at least in part, be defined as lower transmission errors between the AIMI and the ambassador board.

If the communication system is connected to only one ambassador board, or the ambassador boards are in agreement on the information supplied in steps 800 and 801, the active ambassador board assigns TDM slot locations in the destination interface buses to each of the signal destinations of the communication system (804). After the TDM slot locations are assigned (804), the ambassador board receives from each OMI, as a designated signal source, destination information for each of the signal destinations that the OMI is affiliated with (805). If the communication system configuration has not changed (806), the destination address generator (618) awaits a change. If the communication system configuration has changed (806), the destination address generator (618) repeats the process at step 801. Note that if the backup ambassador board becomes the active board, the destination signal generator (618) detects this and sources the backup board information as the destination addresses, without substantial interruption.

Figure 9:
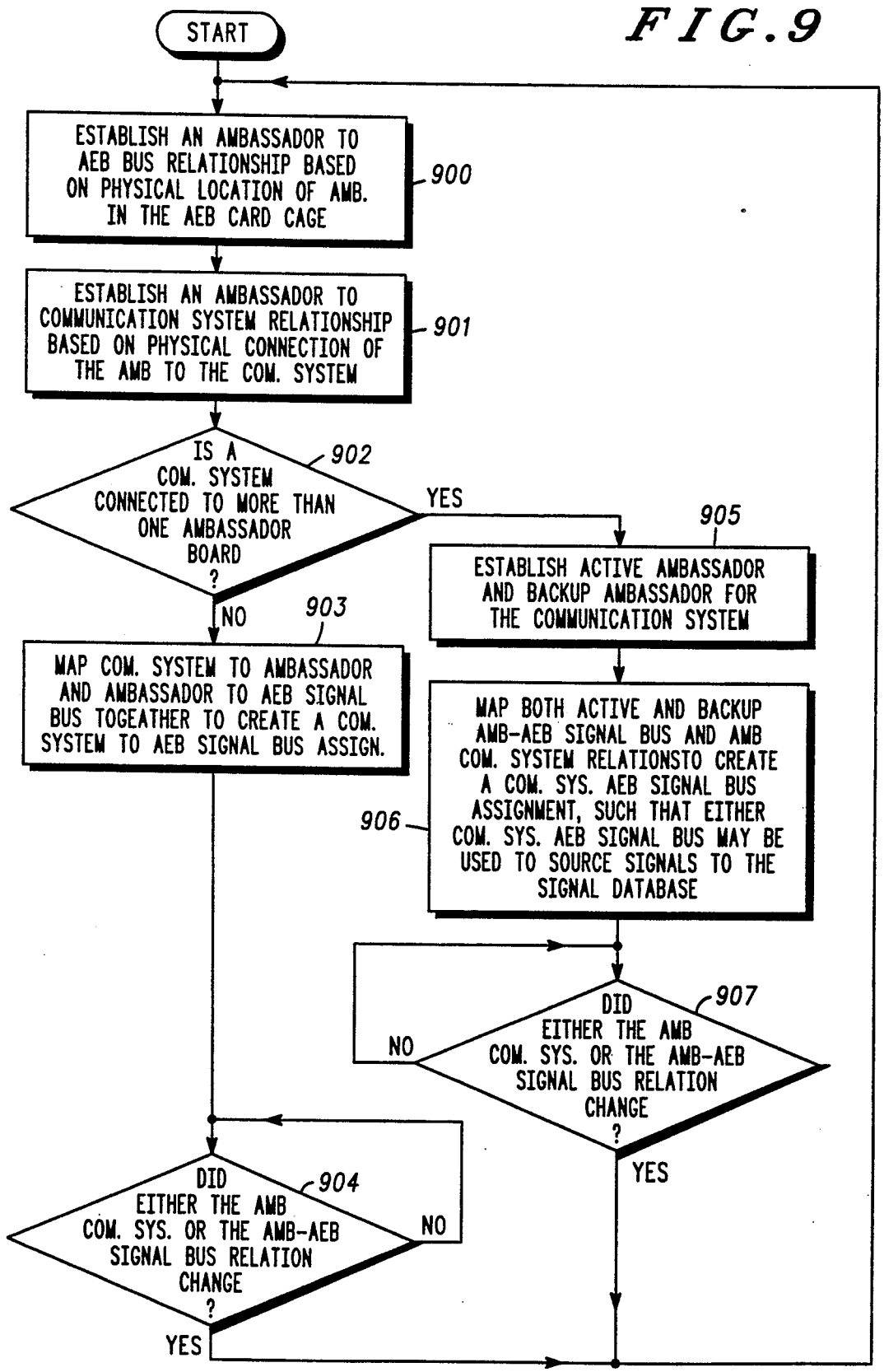
FIG. 9 illustrates a logic diagram of a process for producing addresses for the signal database.

The signal address generator (619) of the ambassador board (403) generates addresses for the signal database (616). The signal address generator (619) which may be a microprocessor, or any digital processing device, generates the addresses as illustrated in the logic diagram of FIG. 9. At step 900, the signal address generator (619) records the ambassador board to AEB signal bus relationship. The best mode contemplates that the AEB will have thirty-two AEB signals buses and and the equivalent of a card cage having thirty-two card connectors. The card connectors are affiliated with an AEB signal bus based on their physical location. For example, the first card connector is affiliated with AEB signal bus 00000 and the thirty-second card connector is affiliated with AEB signal bus 11111. Thus, the ambassador board to AEB signal bus relationship is determined by the card connector that the ambassador board is plugged into. As an alternative example, each card connector may be affiliated with two AEB signal buses such that the first card connector is affiliated with AEB signal buses 00000 and 10000, while the sixteenth card connector is affiliated with AEB signal buses 01111 and 11111.

After the ambassador board to AEB signal bus relationship is established (900), the signal address generator (619) records the ambassador board to communication system relationship (901). The ambassador board to communication system relationship is established by the physical connection of a communication system to a communication port. The best mode contemplates having thirty-two communication ports, each physically affiliated with a card connector, such that the first communication port is affiliated with the first card connector. Thus, the ambassador board to communication system relationship is established by plugging the ambassador board into a card connector and coupling the communication system to the corresponding communication port.

If a communication system is only coupled to one ambassador board (902), the signal address generator (619) maps the communication system to the AEB signal bus that the ambassador board is affiliated with (903). Specific addresses for the signal database are determined by the AEB signal bus affiliation and the slot location in the source interface bus (426). For example, if the signal to be stored is generated in the communication system affiliated with the fifth AEB signal bus and occupies the tenth slot in the source interface bus, the signal address generator will produce 00101 01010 (5,10 in decimal). Thus, the signals produced by that signal source will be addressed as 00101 01010 until its slot location is changed or the communication system to ambassador board relationship changes. If the communication system to ambassador board relationship changes, or the AEB signal bus to ambassador board relationship changes (904), the process repeats at step 900.

If a communication system is coupled to more than one ambassador board (902), an active ambassador board and a backup ambassador board are determined (905). (The selection of an active ambassador board and the backup board was discussed above.) Once the active and backup ambassador boards have been established (905), the signal address generator (619) maps the communication system to the AEB signal bus that the active ambassador board is affiliated with (906). Specific addresses for the signals are determined as described above. The specific addresses remain constant until a change occurs in either the communication system to ambassador board relationship changes (backup board becomes active), or the ambassador board to the AEB signal bus relationship changes (907). If a change does occur (907), the process repeats at step 900.

The signal database circuitry (414) comprises a signal database (616) which may be a DPRAM and an AEB TDM receiver (617) which may be a field programmable gate array. The AEB TDM (617) is coupled to each of the AEB signal data buses (406) and receives the signals, per frame cycle, from each AEB bus and routes them to the signal database (616). The signal database (616) comprises two sections that operate in an alternative manner. Like the elastic store (604), during a frame cycle, the signal database (616) is storing signals received by the AEB TDM receiver (617) in one section and sourcing signals to the processing circuit (412) from the other section. On the next frame cycle, the sections reverse roles, the section that was storing signals is now sourcing signals and the section that was sourcing signals is now storing signals. The signals are stored in either section of the signal database (616) based on an address generated by a signal address generator (619) of the address circuit (411). The signal address generator (619) produces addresses for the signals as described above.

FIG. 11 illustrates a typical format of the signal database (619). The signal database (619) comprises a plurality of address fields (1100), a plurality of PCM code fields (1101), a first section (1102), and a second section (not shown). The second sections format will be identical to the first section (1102), thus only a discussion the first sections format will be presented. As mentioned above, the signal database addresses are determined by AEB bus and slot location of the signal source. Address 00000 00000 (1103) is the address for the PCM code for slot 0 of AEB bus 0. Similarly, addresses 00000 00001 (1104), 00000 00010 (1105), 10111 00000 (1106), and 10111 00001 (1107) are addresses for the PCM codes for slot 1 of AEB bus 0, slot 2 of AEB bus 0, slot 0 of AEB bus 23, and slot 1 of AEB bus 23, respectively. Each of the PCM codes is stored during one frame cycle are sourced during the subsequent frame cycle as described above. The PCM codes of the signals may be placed at different addresses than described above, nevertheless, the best mode contemplates the above addressing process.

The system data database circuitry (410) comprises a first X25 PC controller (606), a bus arbitrator (607), a microprocessor (608), a random access memory device or devices, (609) (RAM), read only memory devices (610) (ROM), a system data database (611), a second X25 PC controller (612), a data arbitrator (613), an address bus (614) and a data bus (615). The first and second X25 PC controllers are devices manufactured by Motorola, Inc. The ROM (610) may be fixed ROMs, EPROMs and/or EEPROMs, and the bus arbitrator (607) may be a field programmable gate array. The destination database (611) may be a DPRAM that comprises two sections, where the sections operate as described below with reference to FIG. 10.

The bus arbitrator (606) allocates the ambassador board data bus (615) to either the first X.25 PC controller (606), the microprocessor (608), or the second X.25 PC controller (612). Allocation of the data bus (615) is given to the section that needs it. For example, when the first X.25 PC controller (606) is sourcing communication system data to the destination database (611) and the RAM (609), the bus arbitrator (606) allocates the data bus (615) to the first X.25 PC controller (606). Similarly, when the microprocessor (608) or the second X.25 PC controller (612) has data to place on the data bus (615), the bus arbitrator (606) allocates it to the requesting data source.

The first X25 PC controller (606), as one of its functions, receives the communication system data and separates it into signal destination data, system configuration data, and supervisory data. The signal destination data contains, for each signal destination of a communication system, information pertaining to which signals it is to receive and at what volume level. For example, the signal destination data may indicate that a signal destination is to only receive one signal from a signal source in another communication system at full volume, or the signal destination data may indicate that a signal destination is to receive the sum of thirty signal sources from various communication systems at various volume levels. The signal destination data for each signal destination is stored in the sections of the destination database (611) based on an address generated by a destination address generator (618) of the address circuit (411). The destination address generator (618) produces addresses for the signal destination data as described above.

The system configuration data and supervisory data are stored in the RAM (609). Unlike the destination database (611) which stores data only for the affiliated communication system(s), the RAM (609) stores data for the entire communication system network (network data). The second X25 PC controller (612) that is operating in transparent mode interfaces the data stored in RAM (609) with the AEB data bus (405). The data arbiter (613), which may be a field programmable gate array, controls the sourcing and sinking of data to and from the AEB data bus (405) and the second X.25 PC controller (612). The data arbiter (613) allows the second X.25 PC controller (612) to sink and source network data to and from the AEB data bus (405).

The detection circuit (409), which may be substantially comprised in the microprocessor (608), monitors the signals and communication system data that is being received from the affiliated communication system. If signals are not being received because the communication system is not operably coupled to the ambassador board (403), the detection circuit (409) generates a data signal that indicates to the rest of the communication system network that the affiliated communication system in not actively connected to the network. The detection circuit (409) also generates a mute signal that is stored in the signal database (616) at the addresses of the signal sources of the affiliated communication system.

FIG. 10 illustrates a format of the destination database (611). The destination database format comprises a first section (1009), and second section (1010), a plurality of address fields (1000), wherein, at each address field, the format comprises an input control signal field (I/C) (1001), two frame control signal fields (FC1 and FC2) (1002 and 1003), three volume control signal fields (VOL.1, VOL.2 and VOL.3) (1004, 1005, and 1006), a signal source bus field (1007), and a signal source slot field (1008). As previously mentioned, the number of entries, or addresses, for the affiliated communication system, or communication systems, is determined by the number of signal sources that each signal destination is to receive signals from. Also mentioned is that each signal destination of the affiliated communication system is assigned a slot location in one destination interface buses (427). Thus, after a frame header, or sync, signal, the first entries into the destination database (611) are for the signal source assigned to slot 1 of the first destination interface bus.

If there are two communication systems affiliated with the ambassador board, each section (1009 and 1010) of the destination database (611) will have two entry blocks, one for each affiliated communication system. The number of entries in each block is determined as described above, such that the total number of entries do not exceed the capacity of the destination database (611). In each entry block, the first entry will be a frame header such that the entry blocks are in sync with the destination interface buses of the affiliated communication systems. After both entry blocks have been entered, the remaining entries in the destination database are filled with null information.

As an illustrative example, assume that the ambassador board is connected to only one communication system, that the signal source assigned to the first slot of the first destination interface bus has the following destination data (1011), and that the first section (1009) is in the storing mode. Recall that the signal destination data comprises the signal sources that the signal destination is to receive signals from and at what volume. For this example, the first signal destination is to receive signals from four signal sources having a bus-slot addresses as shown. The volume levels for each signal is stored in the three volume control fields (1004, 1005, and 1006). By having three fields, a signal's volume level may be set at any one of sixteen levels. For this example, 111 is considered maximum volume and 000 is considered minimum volume, however, any binary representation of minimum to maximum volumes may be used. The I/C field (1001) indicates the end of a signal destination's destination data. For this example, that occurs at address 000 000 000 011.

As a continuation of the above example, assume that the affiliated communication system has only two signal destinations and the second signal destination is to receive signals from two signals sources. The volume levels and the bus-slot address of the signals sources are shown. Once the the entries for both signal destinations have been entered, the remaining entries are filled with null information information (1013 and 1014). The best mode contemplates that one section of the destination database will accommodate up to 128 signal destinations and up to 1750 entries. Thus, for example, each signal destination could receive signals from about 14 signal sources. It will be apparent to a practitioner skilled in the art that the destination database may be made larger or smaller to accommodate more or less signal destinations. It also should be apparent that a signal destination may receive signals from any number of signal destinations so long as the number doesn't exceed the capacity of the destination data base.

The null information is entered into the destination database (611) by the microprocessor (608). Recall that the affiliated communication system sends to the destination address generator (618) information regarding the number of signal destinations within it and the number of entries that each signal destination requires. This information may also be stored in RAM (609) such that it may be used by the microprocessor (608) to enter the null information into the destination database (611). The microprocessor (608) monitors the entry of destination data such that once it is all entered, the microprocessor (608) can enter the null information.

The second section (1010) of the destination database (611) duplicates the information stored in the first section (1009). At start up of the communication system network, both sections may simultaneously receive and store the information. Once the information is stored in both halves, one section acts as a sourcing section while the other acts as a storing section. Unlike the signal database, the destination database (611) does not have its sections alternate functions every frame cycle. Instead, the sourcing section of the destination database remains the sourcing section until new information (e.g. volume change, signal source change, etc.) is received. Once the new information is stored in the storing section, the sections switch functions. The new information is then copied into the new storing section which then awaits another change.

The processing circuit (412) of the ambassador board (403), which may comprise a field programmable gate array, comprises a PCM to linear converter section (624), a summing section (625), a linear to PCM section (626), and a diagnostic latch (627). During every frame cycle, the processing circuit (412), under the control of the microprocessor (608), addresses the signal database (616) based on the destination information stored in the destination database (611). The PCM codes are serially read from the signal database (616) are converted to linear signals by the PCM to linear section (624) and the entries for a signal destination are summed together by the summer section (625). The summer section (625) continually adds the linear signals together, at the volume levels indicated, until a 1 is detected in the I/C field. Once the 1 is detected, the summer section (625) makes one final summation before it outputs a linear resultant to the linear to PCM section (626). The linear resultant is converted into a PCM code by the linear to PCM section (626) and the resulting PCM code, or processed signals, is routed to the TDM buffer (620) of the sending encoder (413). This process is repeated until each of the signal destinations have had a resulting PCM code generated for it.

As previously mentioned, signal destinations comprise AEIs that route signals to CCMs of a console and BIMs that route signals to a plurality of communication units. (Also recall that a BIM acts as a signal source too, such that signals can be transceived to and from the plurality of communication units.) The BIMs may be of two types, the first type is used to interface the communication system to a radio repeater, and the second type (smart phone interface (SPI)) is used to interface the communication system to telephone lines. The summing of signals described above, works equally well for summed signals destined for a CCM of a console as well as to either type of BIM. If the BIM is an SPI, the communication units may comprise telephones and/or radio-telephones such that several telephones lines may be linked together. For example, if a communication system comprises thirty SPIs each affiliated with a telephone line, all thirty telephone lines could be conferenced together. In this example, each SPI would need twenty-nine signal summations equalling a total of eight hundred and seventy summations, which is well within the capabilities of each ambassador board. Recall that the best mode contemplates that the destination database (611) will having up to 1750 summation entries.

The diagnostic latch (627) of the processing circuit (412) routes each of the resulting PCM codes to the microprocessor (608) such that the timing and resultant may be verified. If the microprocessor detects an error either in the timing or in the resultant, the microprocessor (608) may flag an error and shut the ambassador board down. If redundant ambassador boards are used, the error flag would indicate that the backup ambassador board should be active.

The sending encoder (413) of the ambassador board (403) receives the processed signals, or resulting PCM codes via a a TDM, or synchronization, buffer (620). The TDM buffer (620), which may comprise a DPRAM having two sections, stores the processed signals in one section during one frame cycle, then, in the next frame cycle sources the processed signals to a demultiplexer (621). The demultiplexer (621) routes the processed signals that are for signal destinations assigned to slots in the first destination interface bus to a first encoder (622), and the processed signals that are for signal destinations assigned to slots in the second interface bus to a second encoder (623). The first and second encoders (622 and 623), which may be Manchester encoders, encode the processed signals and place the encoded processed signals in to the appropriate slots of the destination interface buses (427).

Figure 7:
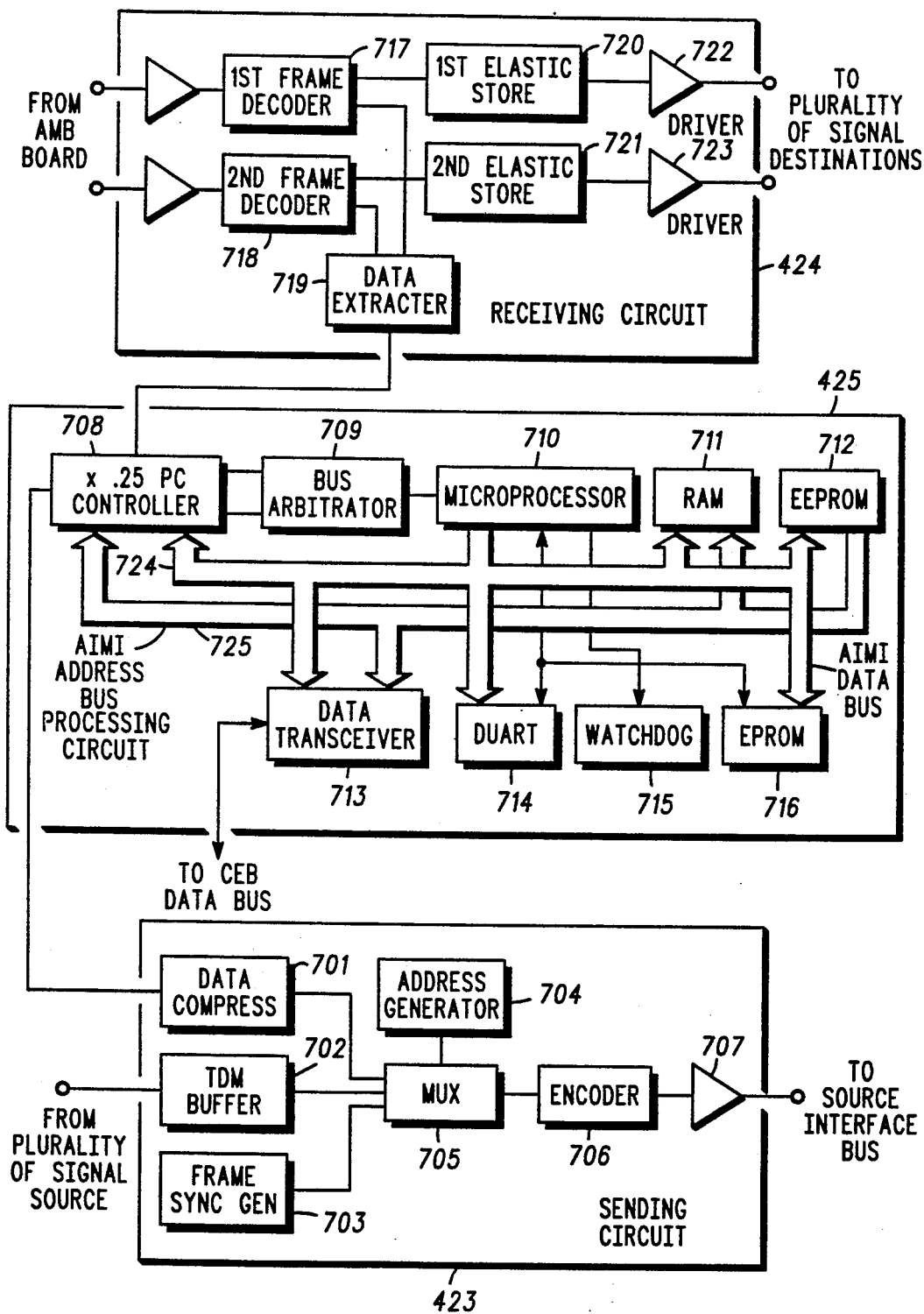
FIG. 7 illustrates a circuit diagram of an ambassador interface multiplex interface board.

FIG. 7 illustrates a block diagram of an ambassador interface MUX interface (AIMI) (417) that, as previously mentioned, comprises a receiving circuit (424), a processing circuit (425) and a sending circuit (423). The receiving circuit (424) comprises a first frame decoder (717), a second frame decoder (718), a data extractor (719), a first elastic store (720), a second elastic store (721), a first line driver (722), and a second line driver (723). The first frame decoder (717), which may be a Manchester decoder, receives and decodes the processed signals on the first destination interface bus. The second frame decoder (718), which may be a Manchester decoder, receives and decodes the processed signals in the second destination interface bus. The received network data is routed to the data extractor (719), which may be a field programmable gate array. The data extractor (719) performs in a similar fashion as the data extractor (603) of the ambassador board (403), described above.

The decoded processed signals are routed from the first and second frame decoders (717 and 718) to the first and second elastic stores, or synchronization buffers (720 and 721), respectively. The first and second elastic stores (720 and 721), which may be field programmable gate arrays, function in a similar fashion as the elastic store (604) of the received decoder (408) in the ambassador board (403). The source section of the first and second elastic stores are sourcing the decoded processed signals to the CEB TDM destination buses (422), via the line drivers (722 and 723).

The processing circuit (425) comprises a X.25 PC controller (708), a bus arbitrator (709), a microprocessor (710), random access memory devices (RAM) (711), an EEPROM (712), an EPROM (716), a data transceiver (713), a dual universal asychronious receiver transmitter (DUART) (714), and a watch dog, or detection circuit, (715). (The DUART (714) is used to interface the CEB with a CAD, such interfacing is known thus no further discussion will be given. Also the function of the watchdog circuit is know such that no further discussion will be given.) The X.25 PC controller (708), which may be a device manufactured by Motorola, Inc. receives network data from the data extractor (719) of the receiving circuit (424) and distributes it throughout the AIMI (417). Network data that is destined for particular signal sources and/or signal destinations is routed to a data compressor (701) of the sending circuit (423). The sending circuit (423) will be discussed below.

The bus arbitrator (709), which may be a field programmable gate array, allocates the AIMI data bus (725) among the X.25 PC controller (708), the microprocessor (710), and the data transceiver (713). When the data transceiver (713), which may be a field programmable gate array, has access to the AIMI data bus (725), it transceives data between the AIMI data bus (725) and the CEB data bus (420). When the microprocessor (710) has access to the AIMI data bus (725), it controls the routing and storing of the network data. When the X.25 PC controller (708) has access to the AIMI data bus (725), it receives the network data from the data extractor (719) and sources it to the rest of the AIMI (417).

The sending circuit (423) of the AIMI (417) prepares the signals produced by the signals sources and the data produced by the communication system for transmission to the ambassador board. Signals produced by the plurality of signal sources are received by a TDM, or synchronization, buffer (702) which may be a DPRAM. The TDM buffer (702) operates in a similar mode as the TDM buffer (620) of the ambassador board. The source section of the TDM buffer (620) routes the signals to a multiplexer (705). The multiplexer (705) combines the signals received from the TDM buffer (702) with the communication system data received from the data extractor (701) and with a communication system clock that is produced by a frame sync generator (703). An address generator (704) produces an addresses and slot assignments for each of the signal sources. The output of the multiplexer (705) is routed to an encoder (706), which may be a Manchester encoder. The encoded signals are placed on the source interface bus (426) via a line driver (707).

The preceding discussion primarily focussed on the conveyance of audio signals between a plurality of signal sources and signal destinations throughout the network under the control of destination data. The network also conveys network data throughout the network. As previously mentioned, network data comprises combinations of communication system data produced by each of the communication systems. One such type of combined communication system data is communication system configuration information. As mention previously, communication system configuration information includes, but is not limited to, the number of repeaters, number of signal sources, the number of signal destinations, the TDM slot assignments for each signal source and signal destination, the type of each BIM, and number and codes of communication groups.

Within the communication system network, which presently contemplates having up to nine hundred and sixty signal sources, it would be impractical to store, in each OMI, communication system configuration information for each communication system. The best mode contemplates that each OMI will store, in existing or additional memory, the communication system configuration information of the communication system that the OMI is located in and only specific communication system configuration information of the other communication systems in the network. For example, if an OMI in communication system 1 produces signal destination information that has an AEI, which is affiliated to the OMI, receiving signals from BIM 1 of communication system 24, the OMI will only store communication system configuration information pertaining to BIM 1 such as what type of BIM it is and its slot location within communication system 24.

The best mode further contemplates that periodically, or when a new communication system is added to the network, that each communication system, via its AIMI board (417), will transmit its communication system configuration information to the other communication systems such that each communication system may verify that the other communication systems have not changed their communication system configuration information. However, with present speeds of digital circuitry, it would be impractical to transmit the communication system configuration information between all of the communication systems. Thus, within each AIMI board (417), the communication system configuration information is converted into a code. The communication system configuration code, which is presently contemplated to be a four bit code, is transmitted to AIMIs of the other communication systems and stored in a communication system configuration code database (not shown), which may be a RAM.

Figure 12:
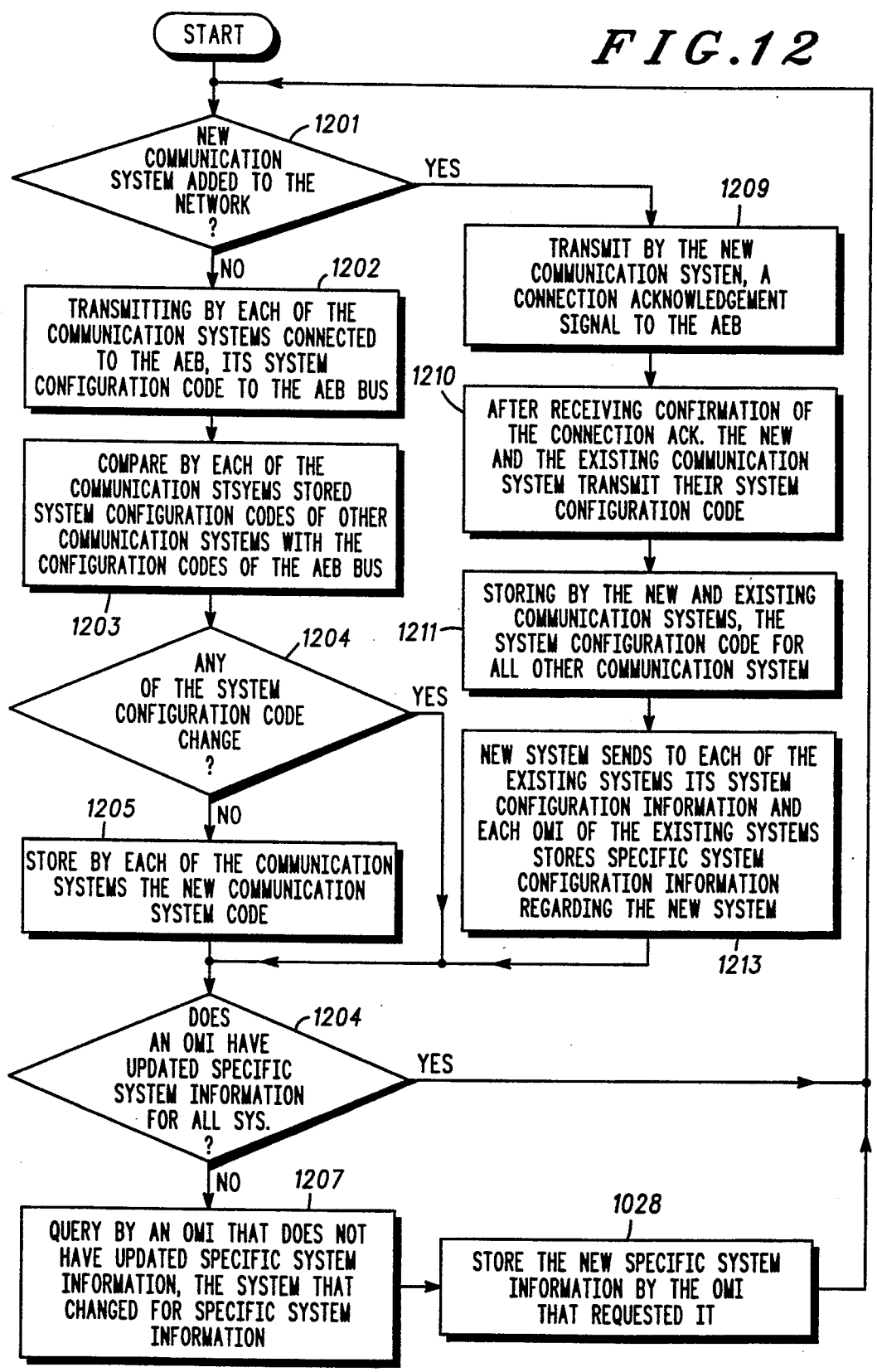
FIG. 12 illustrates a logic diagram of a process for updating each communication system's communication system configuration database.

FIG. 12 illustrates a process for maintaining each OMI's database of communication system configuration information and each AIMI's communication system configuration code database. At startup, each OMI and AIMI is programmed with relevant communication system configuration information and codes, however, such information and codes may change due to a communication system changing its communication system configuration information and code, a new communication system being added to the network, a communication system leaving the network, and a communication system re-entering the network. At step 1201, each communication system that is operably coupled to the AEB, monitors the AEB data bus for an addition of new communication system to the network. If, during a certain interval (one minute, for example), a new communication system is not added to the network (1201), each of the communication systems that is connected to the AEB transmits their system configuration code to the AEB data bus (1202). In each communication system, the AIMI compares the stored code of each communication system with the code on the AEB bus (1203). If the AIMI detects that any of the codes on the AEB data bus is different than its corresponding stored code (1204), the AIMI stores, in the communication system configuration code database, the code on the AEB bus (1205).

If the codes on the AEB data bus are the same as the ones stored in the communication system configuration code database(1204) or after the new codes are stored (1205), each OMI determines if its specific communication system configuration information is up to date (1206). If the specific communication system configuration information is up to date (1206), the process repeats its step (1201). If the specific communication system configuration information is not up to date (1206), each OMI that does not have up to date information queries only the communication systems that contains the specific information that the OMI stores (1207). Once the OMI receives updated specific information, it stores it (1208) and the process repeats at step 1201.

When a new communication system is added to the network (1201), the new system transmits a connection acknowledgement signal to the AEB (1209). After the new communication system receives a confirmation of its acknowledgement signal, the new communication system and the communication systems already connected to the AEB transmit their system configuration code to the AEB bus (1210). The new communication system and the existing communication systems receive and store the codes for each of the communication systems, including the new system (1211). After storing the codes, the new communication system transmits its communication system configuration information to the existing communication systems (1213). Each of the OMIs in the existing communication systems stores specific communication system configuration information regarding the new communication system (1213), then the process proceeds to step 1206 which has been described above.

If a console is equipped with a console interface CPU, or the OMI is equipped with sufficient memory, each OMI may store the communication system configuration information of each communication system in the network. (For a description of a console interface CPU refer to Motorola, Inc. Pub. No. R4-2-73, CENTRACOM Series II Plus Control Centers (April, 1988).) The process for storing specific communication system configuration information will be used in this embodiment except that when a change is detected in a communication system configuration code, the OMI will request and store all of the communication system configuration information of the system that produced the change.

Another type of communication system data that is transmitted throughout the network is BIM user data, where BIM user data comprises a list, produced by each BIM, of signal sources that have selected the BIM. Depending on the type of BIM, radio interface or telephone interface, the contents of the list will vary. For a telephone interfacing BIM (smart telephone interface (SPI)) the list will comprise entries for each signal source that has selected the SPI and what type of telephone connection was requested. Presently, there are two types of telephone connections; private connections and public connections. A private connection allocates a telephone line to a requesting signal source and places a call to the desired destination, while excluding other signal sources from participating in the call. A public connection allocates a telephone line to a requesting signal source and places the call, however, other signal sources may participate in the call by requesting access to the public connection. The requesting process for either type of telephone connection is known, thus no further discussion will be presented.

Once a signal source requests that an SPI allocate it a telephone line, the SPI will record, in a line access database (not shown), the communication system that the signal source is from, the specific signal source, and what type of connection was requested. For a public connection, the SPI would store the requesting signal source's information, store the type of connection, and designate the requesting signal source as a primary signal source. When other signal sources access the public connection, the SPI stores their information and affiliation with the public connection. In a standalone communication system, the SPI would periodically send a data packet to each of the signal sources stored in the line access database asking if the line is still needed. If any of the signal sources responded that the line was needed, the SPI would keep the line active.

In the communication system network, it is impractical to have every SPI send a data packet to each signal source that is accessing it, thus, the SPI periodically sends to the primary signal source, only, a data packet asking the primary signal source if the public line is still needed. If the primary signal source responds that the line is still needed, the SPI keeps the line active. If the primary signal source responds that it does not need the line, the SPI will designate a new primary signal source from the signal sources stored in the line access database and delete the requesting signal source from the line access database. Once the new primary source has been designated, the SPI sends it a data packet asking it if the public connection is still needed. If the primary signal source responds that the line is needed, the SPI keeps the line active, otherwise, the SPI designates another new primary signal source from the line access database. The line remains active until all the signal sources stored in the line access database are designated primary signal source and respond that the line is no longer needed. It should be noted that more than one signal source may be designated as a primary signal source without deviating from the scope of this feature, nevertheless, the best mode contemplates that only one signal source will be designated as a primary signal source at a time.

A BIM that is operating as a radio interface in a standalone communication system would store each signal source that was accessing it and query each signal source whether the BIM was still needed for that signal source. However, in a communication system network this would be impractical. Instead, the best mode contemplates that each BIM will store up to three signal sources that are accessing it in an access database (not shown). When a BIM enters, or re-enters, a communication system of the network, it transmits a data packet to all of the signal sources in the network, where the data packet asks each signal source if it has the BIM selected. The first three signal sources to respond to the data packet will be stored in the access database. Of the signal sources stored, one of them is designated as a primary signal source, where the primary signal source refreshes the BIM. The primary signal source will periodically send to the BIM a data packet indicating that it is still selected. When the primary signal source deselects the BIM, it sends a data packet to the BIM indicating that it has deselected the BIM. Upon receiving the deselection data packet, the BIM designates a new primary signal source from the signal sources stored in the access database. If no signal sources are stored in the access database, the BIM transmits a data packet to the network that asks if any signal sources have selected the BIM. A BIM may store more or less than three signal sources that have selected it, nevertheless, the best mode contemplates that a BIM will store three signal sources.

Another type of communication system data is BIM status data, which indicates the status of a BIM in a communication system such as, for example, select status, auxiliary input/outputs, and link status. Each AIMI of a communication system comprises a BIM status database (which may be in ROM) that contains the status of each BIM in the communication system. Approximately every five seconds, each BIM transmits its status to the AIMI. If the AIMI detects, via an algorithm in the microprocessor (710), that a BIM's status has changed, the AIMI stores the change, flags the change, and transmits the change to the network. The AIMI also transmits the status of BIMs that did not change their status to the network at varying intervals.

The varying time intervals at which the AIMI transmits non-changed BIM status is determined by the number of BIMs that did not change its status during a predetermined time period and by a selected number BIM statuses that an AIMI may transmit at one time. The best mode contemplates that the status of every BIM will be transmitted to the network every minute and that an AIMI may transmit the status of four BIMs at any given time. Thus, if a communication system comprises x number of BIMs and none of the BIMs have changed its status, the AIMI will transmit the status of four BIMs every 4*60/x seconds. If n number of BIMs change their status, the AIMI will transmit the status of non-changing BIMs every 4*60/(X−n) seconds. For example, if the communication system has 20 BIMs and none of them have changed their status, the AIMI will transmit the status of the first four BIMs stored in the BIM status database every 12 seconds (4*60/20). If, during the next varying time interval, five BIMs change their status, the next four non-changing BIM status will be sent 16 seconds (4*60/(20−5)) after the previous status update information was sent.

With each communication system, via its affiliated ambassador board, transmitting and receiving network data as described above, access to the AEB data bus (405) must be controlled. The system synchronization circuit (404) polls, in a round robin fashion based on an ambassador board's physical location in the card cage, each ambassadors board (403) as to whether it wants access to the AEB data bus (405). When an ambassador board (403) indicates that it wants the AEB data bus (405), the system synchronization circuit (404) stops polling until the requesting ambassador board is done with the AEB data bus (405). When the requesting ambassador board is done with the AEB data bus (405), the system synchronization circuit (404) resumes the polling process with the next ambassador board (403) in the queue. When network data is not being transmitted on the AEB data bus (405), the system synchronization circuit (404) transmits a bus idle signal. Also, when an ambassador board is not transmitting data, the second X.25 PC controller (612) is producing a pad signal which is prevented from being placed on the AEB data bus (405) by the data arbiter (613).

Figure 13:
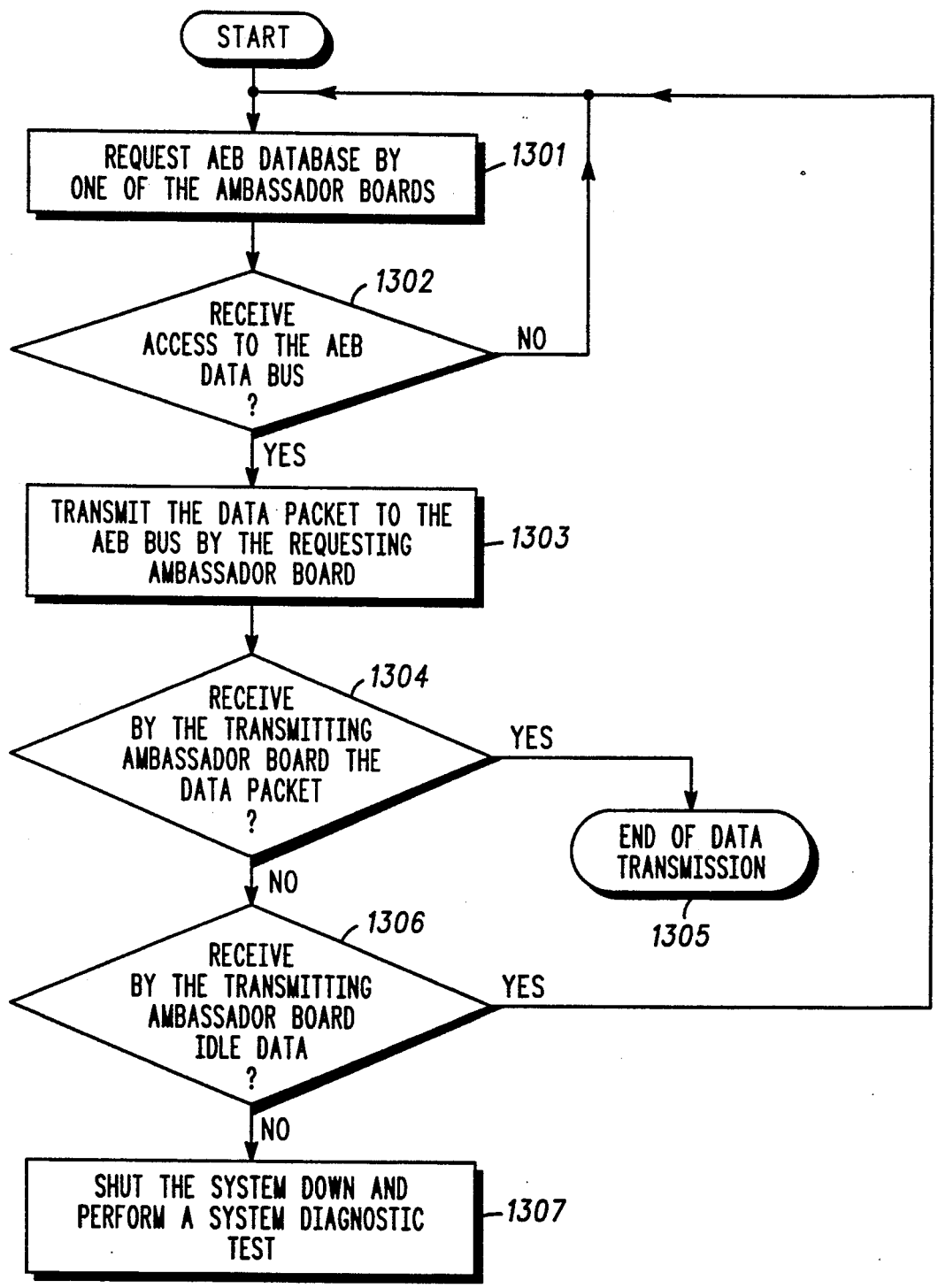
FIG. 13 illustrates a logic diagram of a process for controlling access to the AEB data bus.

FIG. 13 illustrates a logic diagram for accessing the AEB data bus (405) by an ambassador board (403). At step 1301 an ambassador board (403) requests access to the AEB data bus (405). The ambassador board (403) will request the AEB data bus as soon as it has data to transmit on the bus (405), however, it will not get access to the bus (405) until it is polled by the system synchronization circuit (404) (1302). Once the ambassador board is granted access to the bus (1302), the microprocessor (608) of the requesting ambassador board places the line driver (624) in an active state such that the pad signals being generated by the second X.25 PC controller (612) are placed on the AEB data bus (405). Typically, each of the second X.25 PC controllers (612) continually produces pad signals except for when it is transmitting data onto the AEB data bus (405). The pad signals are prevented from being placed on the AEB data bus because the line driver (624) is normally in a high impedance state.

The pad signals on the bus indicates to all of the ambassador boards, including the requesting ambassador board, that data is going to be transmitted on the bus. Once the microprocessor (608) of the requesting ambassador board recognizes the pad signals, it enables the second X.25 PC controller (612) to transmit the data onto the AEB data bus (1303). After the data has been transmitted on the bus (405), the second X.25 PC controller (612) resumes transmitting pad signals. If the microprocessor (608) of the requesting ambassador board received the first set of pad signals, the data, and the second set of pad signals (1304), the microprocessor (608) places the line driver (624) in a high impedance state such the pad signals are no longer placed on the bus (405). Once the liner driver is placed in a high impedance state, the system synchronization circuit (404) resumes placing idle signals on the bus which indicates the end of the data transmission (1305).

If the microprocessor (608) of the requesting ambassador board does not receive either the first set of pad signals, the data, or the second set of pad signals, is the microprocessor (608) receiving idle signals (1306). If the microprocessor (608) is receiving idle signals (1306), the ambassador board rerequests access to the AEB data bus (405) (1301). If the microprocessor is not receiving idle signals (1306), the communication system network is shutdown such that a system diagnostics check can be performed.

What is claimed is:

1. In a communication system network that includes a processing multiplexer, a plurality of communication units, and a plurality of communication systems, wherein each of the plurality of communication systems includes base interface means for interfacing with a limited number of repeaters that transceive information amongst the plurality of communication units and processing multiplexer interface means for interfacing the communication system with the processing multiplexer, and wherein each processing multiplexer interface means includes a base interface database that stores base interface status information of the base interface means of each of the plurality of communication systems, a method for maintaining the base interface database in each of the plurality of communication systems, the method comprises the steps of:

a) detecting, by a processing multiplexer interface means of one of the communication systems, a change in base interface status information of the base interface means of the one of the communication systems;

b) storing the changed base interface status information in the base interface database of the processing multiplexer interface means;

c) transmitting, by the processing multiplexer interface means, the changed base interface status information to the processing multiplexer interface means of the other communication systems when the change in the base interface status information is detected; and d) transmitting, by the processing multiplexer interface means, unchanged base interface status information to the processing interface means of the other communication systems at varying time intervals.

2. The method of claim 1 further comprises determining a subsequent varying time interval based upon changed base interface status information transmissions during a preceding varying time interval and quantity of base interface status information in the base interface information database.

3. In the method of claim 2, step (d) further comprises transmitting a predetermined number of unchanged base interface status information at the expiration of a varying time interval.

4. The method of claim 3 further comprises transmitting all base interface status information within a predetermined time period.

5. In a communication system network that includes a processing multiplexer, a plurality of communication units, and a plurality of communication systems, wherein each of the plurality of communication systems includes base interface means for interfacing with a limited number of repeaters that transceive information amongst the plurality of communication units and processing multiplexer interface means for interfacing the communication system with the processing multiplexer, and wherein the processing multiplexer interface means of each of the plurality of communication systems comprises:

base interface database means for storing base interface status information of the base interface means of each of the plurality of communication systems;

detection means, operably coupled to the base interface database means, for detecting a change in the base interface status information of the base interface means of the respective communication system;

varying time means, operably associated with the base interface database means and the detection means, for determining varying time intervals, wherein a varying time interval is based upon changed base interface status information transmissions during a preceding varying time interval and quantity of base interface status information in the base interface information database; and transmission means, operably coupled to the base interface database means, the detection means, and the varying time means, for transmitting changed base interface information when it is detected and for transmitting a predetermined portion of unchanged base interface information at the varying time intervals.

* * * * *